June 2, 1931.  E. J. WENDELL  1,808,700
SHOCK ABSORBER
Filed April 9, 1928

Inventor:-
Evert J. Wendell,
by his Attorneys
Howson & Howson

Patented June 2, 1931

1,808,700

UNITED STATES PATENT OFFICE

EVERT J. WENDELL, OF WAYNE, PENNSYLVANIA

SHOCK ABSORBER

Application filed April 9, 1928. Serial No. 268,628.

This invention relates to improvements in shock absorbers, and the principal object of the invention is to provide a shock absorber of novel and simple form which shall be highly efficient in operation and capable of operation on the double action principle in which relative movement of two members to which the shock absorber is attached in either direction from a normal intermediate position is controlled and predeterminedly regulated by the device.

Figure 1:
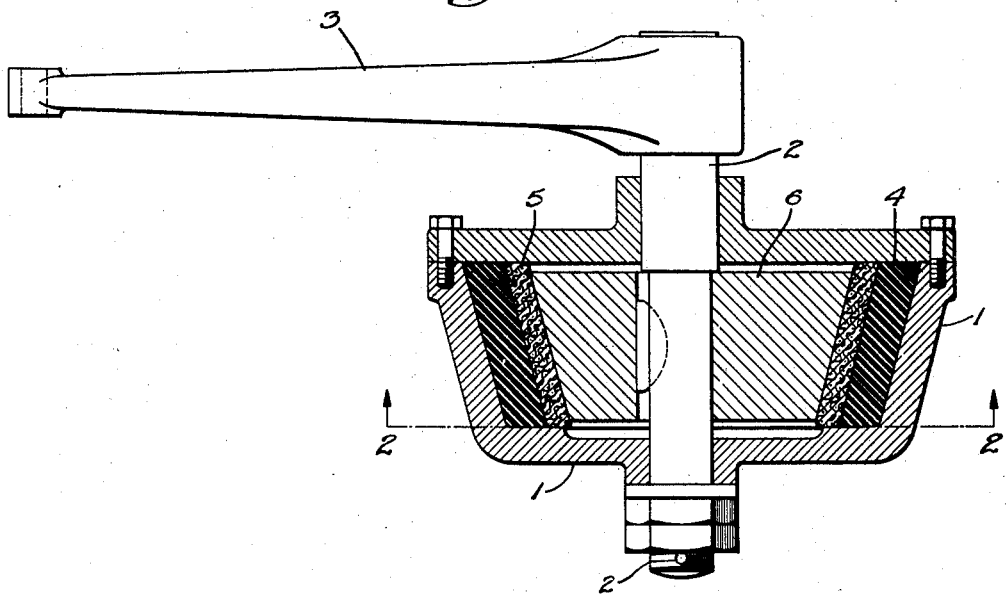
Figure 2:
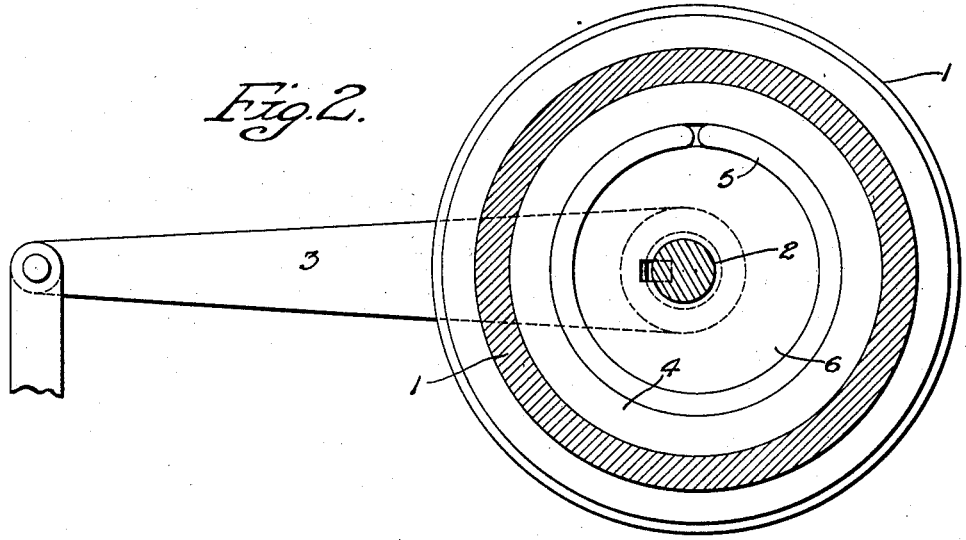

The invention further resides in certain novel structural characteristics and features including adjustment means, as hereinafter set forth and as illustrated in the attached drawings, in which:

Figure 1 is a sectional view through a shock absorber made in accordance with my invention, and Fig. 2 is a transverse section on the line 2—2, Fig. 1.

Referring to the drawings, my device in a preferred form comprises a housing or casing 1 which may be cylindrical in form and which has journaled therein a shaft 2 which at one end projects through the casing to the exterior for attachment of an arm 3 affording means for relatively rotating the shaft and the casing. The casing 1 is adapted for attachment to one of two relatively moving parts the motion of which it is desired to regulate, the other part being suitably connected with the outer end of the lever 3. The device is adapted particularly to the control of the spring action in motor vehicles, and the aforesaid relatively moving parts in this application may be the frame of the vehicle and one of the axles which through an interposed spring supports the body.

In the interior of the housing 1 is an annular rubber or other resilient pad 4 which in the illustrated embodiment abuts the inner circular wall of the casing. Inwardly of the pad 4 is a strip 5 of suitable friction-resisting material such as that used in brake linings, this band closely embracing an inner cylinder 6 which is eccentrically mounted on and secured to the shaft 2. Preferably the drum 6, the band 5, the pad 4 and the casing 1 are normally concentric so that the shaft 2 is eccentric to all of these elements, although substantially the same effect is obtainable by forming the casing and shaft concentric and employing an eccentrically apertured resilient pad.

In operation, the relative movement of the parts to which the shock absorber is connected as described above results in an oscillation of the shaft 2 and with it the drum 6. Oscillation of the shaft in either direction is opposed by friction between the drum and the band 5 modified and automatically regulated predeterminedly by the resilient pad operating cooperatively with eccentricity of the drum. This action arises from the differential movement between the drum and the casing, one component of the movement being such as to be frictionally opposed by the band 5, and the other component resulting in a compression of the resilient member with a consequent regulation of the amount of the friction opposing the relative movement. The degree of compression of the pad and hence the frictional resistance to the rotary movement of the drum increases progressively on either side of the normal position as the shaft oscillates, and the movement of said relatively movable parts is accordingly retarded by a progressively increasing frictional force until the parts are brought to rest. During the return movement of the parts to their normal relative positions, the energy stored in the rubber pad during compression acts through the brake lining 5 to bind the drum and to frictionally retard the movement but with a continuously decreasing force until the original position is obtained. If the rebound to the normal position is such as to carry the parts past their position of normal rest, the movement of the parts in the opposite direction is similarly controlled.

It will be apparent that were the drum rotatable about an axis concentric with the casing, no compression of the pad would occur, but the differential movement of these parts introduced by the eccentric arrangement results in a variable compression of the pad which accordingly functions to control and regulate the frictional resistance to the turning of the drum. Obviously the differential movement affording the same results may be obtained by other means than by use of an eccentric drum, and the means will vary with the form of the device as a whole.

Initially, the rubber band 4 may be under some compression, or may be entirely expanded, as may be found desirable, and the effective operation of the device may be adjusted and regulated to meet the various requirements by the degree of eccentricity of the drum and the resiliency and general character of the resilient member. This latter may be uniformly resilient or may vary in this respect in different parts.

Relative adjustment of the parts of the device for taking up wear and for regulating the effective resistance of the device may be accomplished, as illustrated in Fig. 2, by making the drum 6 tapered and by conforming the band 5 and the pad 4 to the tapered form of the drum. By then providing means whereby the drum may be adjusted axially with respect to the casing and to the pad 4, it is obvious that the degree of compression of the resilient member in the rest position may be regulated as desired; or the resilient member may be entirely expanded and the drum adjusted with respect thereto as required for the desired action.

It is apparent that the device in principle is subject to many different forms and embodiments without departure from the essential features of the invention.

I claim:

1. In a shock absorber, the combination with spaced members adapted for angularly convergent movement, of a resilient rubber element occupying the space between said members to predeterminedly regulate said movement.

2. In a shock absorber, the combination with spaced members having oppositely arranged surfaces adapted for progressive angularly convergent and divergent movements, of a resilient rubber element interposed between said surfaces to predeterminedly regulate said movements.

3. In a shock absorber, the combination with spaced members adapted for angularly convergent and divergent movements, of friction producing means of resilient rubber occupying the space between and adapted to oppose the relative movements of said members and including a resilient element variably compressible in said movements to thereby predeterminedly regulate the amount of said friction.

4. A shock absorber, comprising a rotary member having an eccentric surface, and relatively fixed means frictionally engaging said surface and including a resilient element concentric with said member.

5. A shock absorber comprising a rotary shaft, an element attached to the shaft and having a convexed surface eccentric with respect to the shaft, resilient friction means closely embracing said eccentric surface, a housing confining said friction means, and means attached to said shaft for oscillating the latter in accordance with the relative movement of two members to one of which the shaft is operatively connected and to the other of which the said housing is secured.

6. A shock absorber comprising a casing, a rotary member eccentrically movable in the casing, and a resilient member between the casing and said rotary member compressible by the eccentric movement of the latter.

7. A shock absorber comprising a casing, a rotary member eccentrically movable with respect to the casing, a resilient element intermediate the casing and said rotary member compressible by the eccentric movement of the latter, and means for relatively adjusting the parts to regulate the amount of said compression.

8. In a shock absorber, the combination with a substantially cylindrical casing, of a rotary axially tapered member eccentrically movable in the casing, means for adjusting said member axially in the casing, and a resilient member interposed between the casing and said member and having its inner face tapered in conformity with the taper of the said member.

9. In a shock absorber, the combination with a substantially cylindrical and axially tapered casing, of a rotary member eccentrically movable in the casing and also axially tapered, means for axially adjusting said member in the casing, and a resilient pad occupying the space between the casing and the periphery of said member.

10. In a shock absorber, the combination with a relatively fixed member, of a second member differentially movable with respect thereto, and a friction-resisting material together with a resilient compressible body filling the space between the fixed and movable members so that the differential movement of the one in relation to the other will compress the resilient material and thereby increase the friction between the friction-resisting material and the movable member progressively as motion continues in either direction from a neutral and which will progressively decrease the friction as the motion returns in either direction toward the neutral.

11. In a shock absorber, the combination with a relatively fixed member, of a second member differentially movable with respect thereto, a resilient compressible body interposed between said members and adapted to exert a pressure against the movable member frictionally opposing movement thereof, said resilient body being compressed progressively by reason of the differential movement of said members as the one member moves in either direction from a neutral position.

12. In a shock absorber, the combination with a relatively fixed member, of a second member differentially movable with respect thereto, a resilient body interposed between said members and adapted to exert a pressure thereon tending to oppose their relative movement, and a friction-resisting material interposed between the resilient body and the surfaces of said members that are relatively movable with respect thereto, said differential movement of said members resulting in a progressively increasing compression of said resilient body as the members move relatively to each other in either direction from a neutral position, and the energy stored in said body in compression functioning to bind the parts and to frictionally retard the return movement of said parts to the normal relative position.

13. In a shock absorber, the combination with a pair of relatively movable members, of a resilient member interposed therebetween the said relative movement of said members being differential in character so as to be opposed in part by frictional engagement with and in part by direct compression of the said resilient member.

14. A shock absorber comprising two members and an interposed resilient member, said first-named members being differentially movable with respect to each other whereby said relative movement is opposed in part by friction with said resilient member and in part by direct compression.

EVERT J. WENDELL.